United States Patent [19]

Campbell

[11] Patent Number: 4,513,731
[45] Date of Patent: Apr. 30, 1985

[54] SOLAR HEAT COLLECTOR

[76] Inventor: Willis R. Campbell, R.D. #3, Box 58, Ephrata, Pa. 17522

[21] Appl. No.: 429,229

[22] Filed: Sep. 30, 1982

[51] Int. Cl.³ .................................................. F24J 3/02
[52] U.S. Cl. .................................... 126/432; 126/437; 126/440
[58] Field of Search ............. 126/446, 439, 444, 450, 126/424, 442, 443, 417, 415

[56] References Cited

U.S. PATENT DOCUMENTS

| 2,213,894 | 9/1940 | Barry | 126/443 X |
|---|---|---|---|
| 2,402,326 | 6/1946 | Harkness | 126/446 |
| 3,927,659 | 12/1975 | Blake et al. | 126/450 X |
| 4,030,478 | 6/1977 | Beaver | 126/448 |
| 4,086,911 | 5/1978 | Futch | 126/422 X |
| 4,103,673 | 8/1978 | Woodworth et al. | 126/439 |
| 4,116,223 | 9/1978 | Vasilantone | 126/435 |
| 4,212,290 | 6/1980 | Warnken | 126/446 X |
| 4,220,140 | 9/1980 | Francia | 126/450 X |
| 4,249,515 | 2/1981 | Page | 126/417 X |
| 4,289,119 | 9/1981 | Meyer | 126/440 |
| 4,301,786 | 11/1981 | Kirchmayer | 126/447 X |
| 4,341,204 | 7/1982 | Bloxsom | 126/440 |

FOREIGN PATENT DOCUMENTS

| 8202087 | 6/1982 | Int'l Pat. Institute | 126/446 |
| 547475 | 8/1956 | Italy | 126/440 |

Primary Examiner—Larry Jones
Assistant Examiner—Carl D. Price
Attorney, Agent, or Firm—Larry W. Miller

[57] ABSTRACT

A solar heat collector for use at a predetermined latitude includes a surface of revolution comprising an inner, upwardly convex right conical frustum and an outer, upwardly concave right conical frustum, the walls of which each have a rise angle equal to the latitude plus from zero to about fifteen degrees, fluid conduit means defining a spiral path along the surfaces of the frustums, and means for circulating fluid through the conduit means. In preferred embodiments, the collector includes a translucent, circular, upwardly convex dome-shaped cover.

20 Claims, 5 Drawing Figures

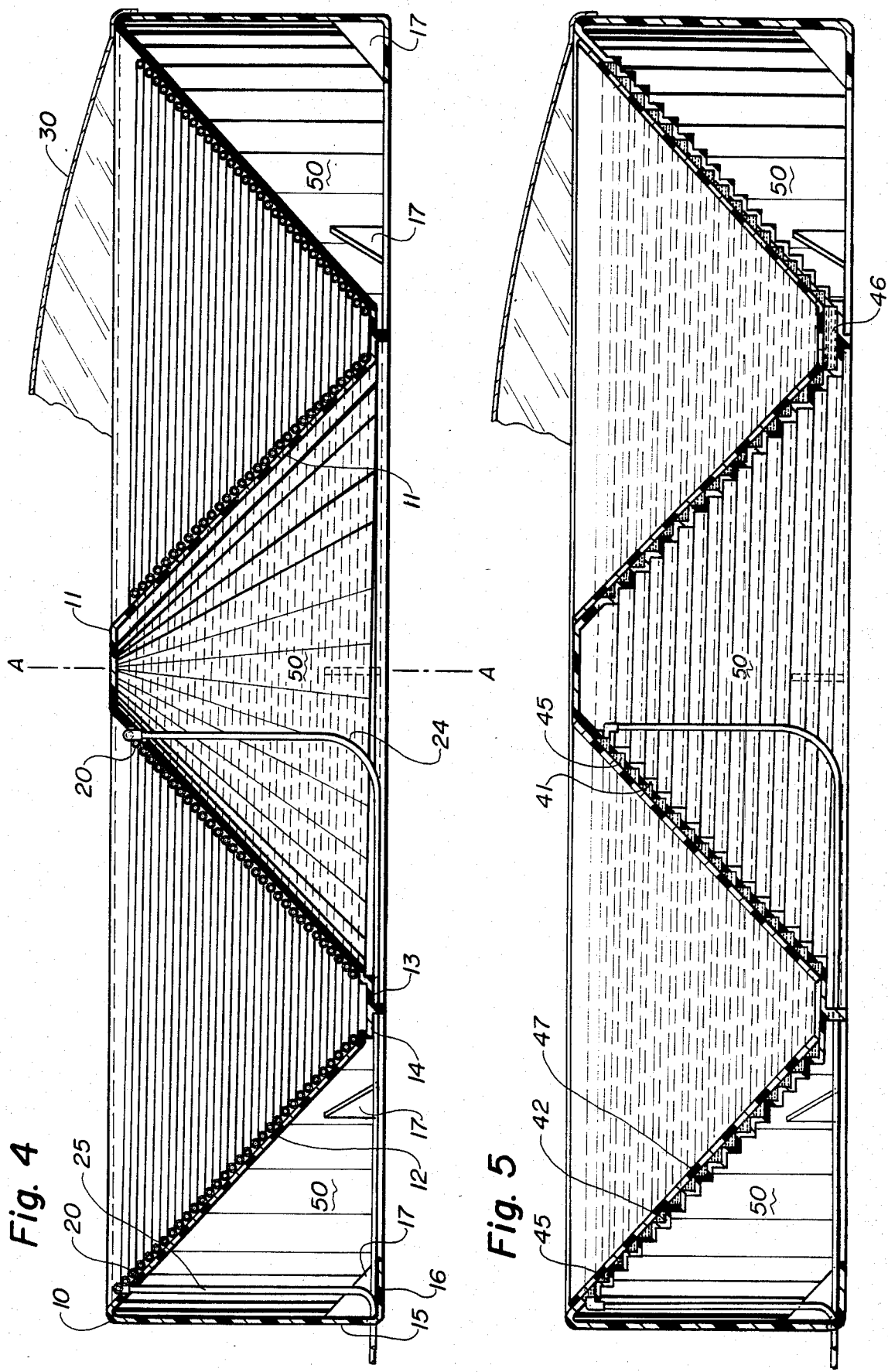

SOLAR HEAT COLLECTOR

BACKGROUND OF THE INVENTION

1. Field of the Invention

This invention relates to solar heat collectors. More particularly, it relates to a solar heat collector the shape of which provides increased heat collecting volume as compared to flat collecting panels of the same base area and enables the collector to provide heated fluid in a fixed position—i.e. without the necessity for tracking the sun—and on both cloudy and clear days.

2. Description of the Prior Art

As solar heat collectors have increased in numbers and popularity, the number of designs has also increased. The most common design for small scale use—e.g., domestic hot water heating and the like—has been a panel design, in which the collector module is a rectangular panel having a flat surface facing the sunlight. The flat surface is generally light transmissive and serves as a cover for one of numerous possible arrangements for moving air or fluid through the collector to be heated. See for example, U.S. Pat. Nos. 4,067,319; 4,120,282; and 4,136,669. Generally, panel collectors or elements thereof should "track" the sun for optimum operation, although many installations are permanently fixed at an angle which provides maximum heating at the latitude of use during clear winter days when heat is most needed. Panel collectors are in wide use and function satisfactorily, but they have the disadvantages that they are often complex and expensive to construct and frequently three or four or more panels are required to obtain the desired amount of heating.

In another approach to solar collector design, Thannhauser U.S. Pat. No. 3,254,644 discloses an upwardly concave conical thermosyphon in which a light-absorbing metal tube or non-metallic hose lines the inner surface of an upwardly open cone mounted with its axis perpendicular to the earth's surface. This unit presents at least a portion of the heat absorbing surface perpendicular to the sun's rays during the daylight hours. Fluid to be heated, e.g. water, enters the Thannhauser unit at the bottom of the cone—i.e. at its apex—and as it is heated thermosyphon action causes it to move through the tube in a spiral path toward the top of the unit where the outlet is located.

Thannhauser's thermosyphon is simple in design but because it is a thermosyphon the rate of fluid circulation through it is slow; moreover, if pump means were used to circulate the fluid at a higher rate, the single conical shape would have to be impractically high to provide sufficient heating surface for any significant heating. Another disadvantage of the Thannhauser unit is that its upwardly open conical shape not only results in little if any heating on overcast days but also acts as a cup to catch falling leaves, etc., thereby causing upkeep and cleaning problems.

SUMMARY OF THE INVENTION

I have discovered that many of the disadvantages of both the Thannhauser thermosyphon and prior art panel solar collectors can be eliminated by the solar collector of my design.

In accordance with the invention, I provide a solar heat collector for use at a predetermined latitude, comprising: (a) means forming a surface of revolution about a generally vertical axis, said surface of revolution including (i) an inner, upwardly convex right conical frustum having predetermined height and a base, and (ii) an outer, upwardly concave right conical frustum having height equal to the height of the inner frustum, a lower interior rim which is contiguous with the base of the inner frustum, and an upper exterior rim, the walls of said frustums each having a rise angle equal to said predetermined latitude plus from zero to about 15 degrees; (b) fluid conduit means associated with said surface of revolution and defining a spiral path along the outer surface of said inner frustum from the top to the base thereof and along the inner surface of said outer frustum from the interior rim to the exterior rim thereof, said conduit means having a light absorbing surface; and (c) means for circulating a fluid to be heated through said conduit means.

In a preferred embodiment I provide a solar heat collector as described further including a translucent, upwardly convex, dome-shaped circular cover, the periphery of which engages the upper rim of the outer frustum, whereby the interior of the collector is insulated and protected from rain, falling leaves, and the like. In order to concentrate the sun's rays, I may fabricate the cover such that the thickness thereof is greater at the center than at the edge. As used herein, the term "translucent" embraces both translucence and transparence.

In one embodiment of my collector, the fluid conduit means comprise tubing, preferably metal tubing.

In another embodiment of my collector, the fluid conduit means comprise channels molded into the surface of revolution and sealingly covered by a member shaped conformably to the surface of revolution.

As compared to Thannhauser's thermosyphon, my solar heat collector (a) provides up to three times the amount of collecting area for a given height and diameter and thus heats the circulating fluid more rapidly, and (b) when I include the translucent domed cover, requires less maintenance and is further improved by the "greenhouse" effect.

BRIEF DESCRIPTION OF THE DRAWINGS

In the accompanying drawings I have shown certain present preferred embodiments of the invention in which:

FIG. 4 is a transverse sectional view of the collector of FIG. 1, taken generally along the line 4—4 of FIG. 1; and FIG. 5 is a view like FIG. 4 of another embodiment of the collector wherein fluid passages are formed integrally into the surface of revolution.

DESCRIPTION OF THE PREFERRED EMBODIMENTS

Figure 1:
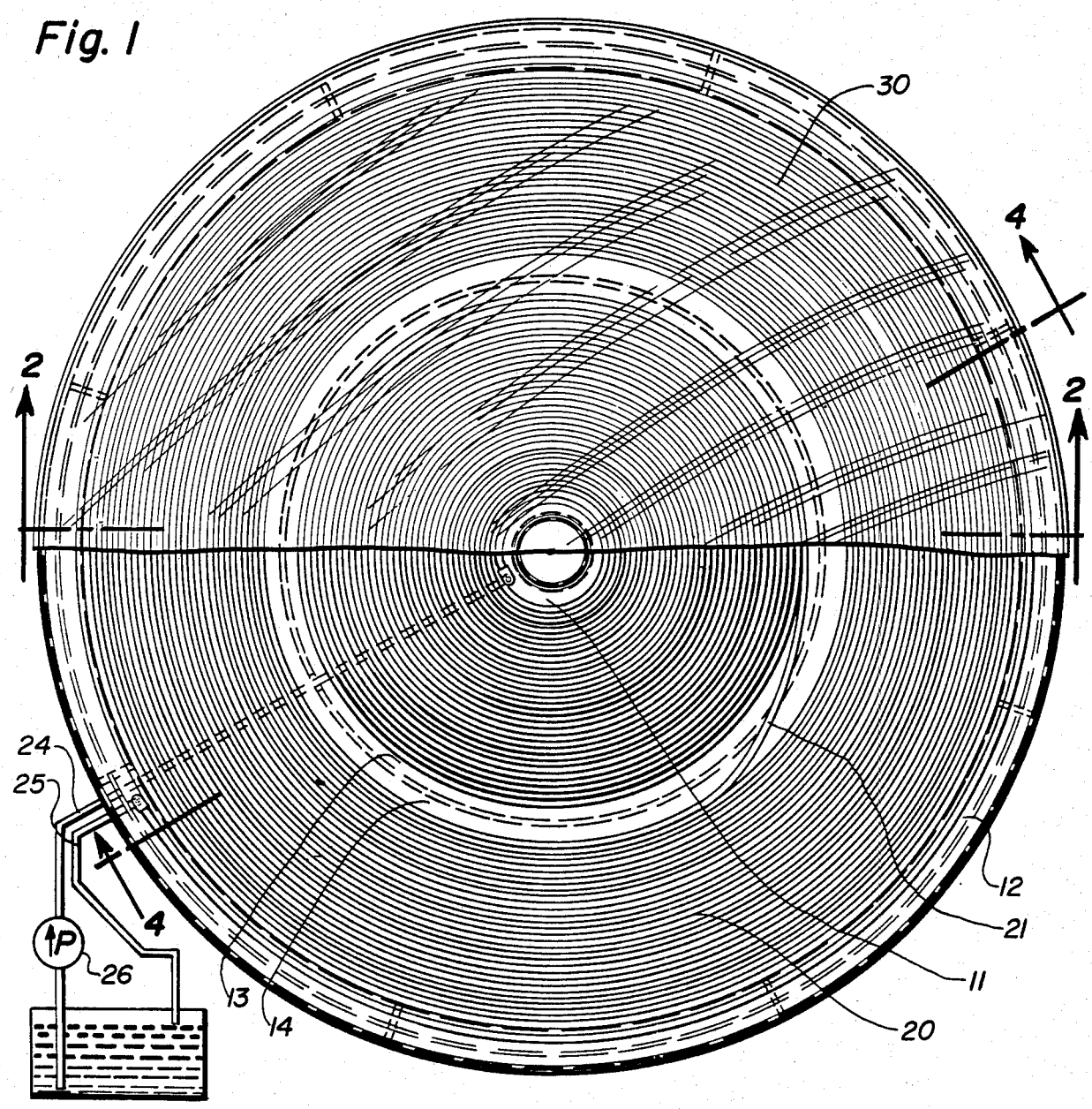
FIG. 1 is a top plan view of a solar collector according to the invention, with half of its cover broken away.

Turning first to FIGS. 1 and 4, in which like numerals identify like features, there is shown a frame 10, which may be fabricated from metals or non-metals—for example, polycarbonate or polyethylene could be used satisfactorily. The frame serves as means forming a surface of revolution about a generally vertical axis A—A, which surface includes an inner, upwardly convex right conical frustum 11 and an outer upwardly concave right conical frustum 12, the height of which is equal to that of the inner frustum. Base 13 of inner frustum 11 is contiguous to the lower interior rim 14 of outer frustum 12. Frame 10 may advantageously be formed in one piece including an outer wall 15 and a turned under rim 16 reinforced by gussets 17.

I have found that for best operation the walls of frustums 11 and 12 should each have a rise angle (defined as the acute angle formed by the wall of the frustum and a plane perpendicular to axis A—A) equal to the latitude at which the collector is to be used plus from zero to about fifteen degrees. For example, in south central Pennsylvania, which is at about forty-one degrees latitude, I may typically use a rise angle of about forty-five degrees. With such rise angle my collector does not need to be tilted to face the sun, although tilting may add somewhat to the collector's efficiency.

Tubing 20, which may advantageously be copper tubing with its exterior surface treated to provide good light absorbing characteristics, serves as fluid conduit means which define a spiral path along the outer surface of inner frustum 11 from the top to the base thereof, cross from the inner to the outer frustum at the common base, as shown at 21, and define another spiral path from the lower interior rim to the upper exterior rim of the outer frustum 12.

It will be appreciated that as shown in the drawing figures the tube 20 forms a spiral coil having an inner section supported by the inner frustum, an outer section supported by the outer frustum and an intermediate section connecting the inner section with the outer section. Preferably, as also shown in the drawing figures, the tubing of the inner and outer sections is wound tightly in stacked loops such that each individual loop contacts an adjacent loop. Pipe 24 is connected to the inner end of tube 20 and serves as an inlet for fluid to be heated; pipe 25, connected to the outer end of tube 20, serves as an outlet for heated fluid. Because of the shape of my collector, it will not function as a thermosyphon; consequently, the system must include means 26 for circulating fluid to be heated through the pipe or other fluid conduit. Such circulating means may operate on either the inlet or the outlet side of the collector, and may be of any suitable type, such as pump or the like. It should be understood that the liquid travel path and direction may be different from that discussed hereinabove—e.g., pipe 25 could be an inlet and pipe 24 an outlet.

Figure 2:
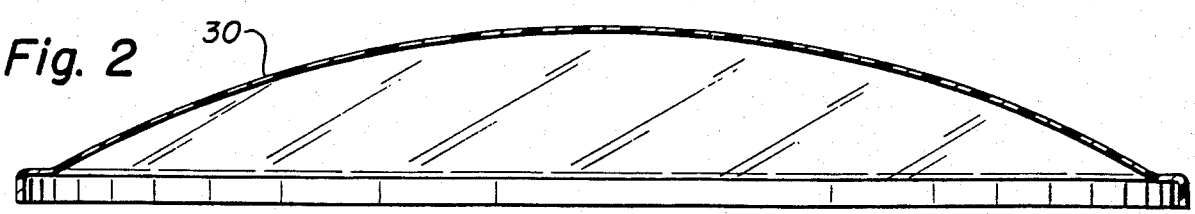
FIG. 2 is a sectional view of one embodiment of the cover taken along Line 2—2 of FIG. 1.

As above indicated, the preferred embodiment of my collector includes a translucent, upwardly convex dome-shaped circular cover 30, shown broken away in FIGS. 1 and 4 and shown in cross-section in FIG. 2. The periphery of cover 30 engages the upper rim of outer frustum 12; efficiency can be increased if such engagement forms a seal, but a seal is not required in the practice of the invention. For theoretically ideal operation the interior space should be completely sealed and under a slight vacuum. Cover 30, which may be fabricated from either glass or plastic, as long as the material used is translucent, provides several advantages: First, it serves to prevent leaves, snow, and other residue from falling into the collector and thus eliminates the chore of periodically cleaning out the unit. Second, the dome shape helps to keep the surface of the cover itself clean and free from leaves and other debris which might collect on a flat or concave surface. Third, the cover tends to alter the characteristics of ultraviolet rays passing through it, such that the rays are "trapped" within the collector and thereby provide additional heating of the fluid conduit means; this is the familiar "hothouse" or "greenhouse" effect, and besides increasing heat input on clear days it enables the unit to absorb solar heat even on cloudy days when fewer visible solar rays strike the collecting surface.

Figure 3:
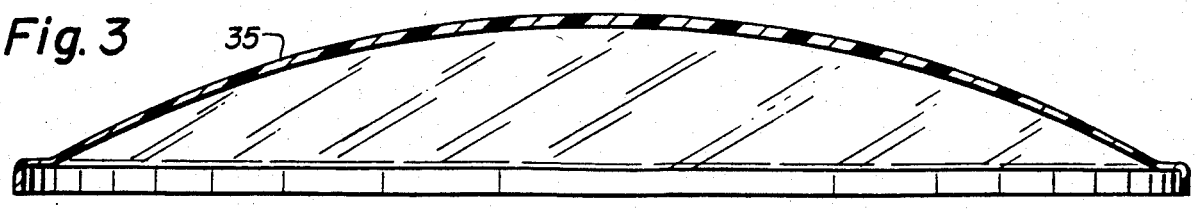
FIG. 3 is a sectional view like FIG. 2 of another embodiment of the cover which is thicker at the center than at its edges and thus acts as a magnifier.

The efficiency of my collector can be further increased by providing a cover 35 as shown in FIG. 3, in which the thickness is greater at the center than at the edges such that the cover acts as a magnifying glass to concentrate the solar rays within the collector. Selection of the dimensions of such a magnifying cover is within the skill of the lens-making art and the amount of magnification can be varied as desired by the user. Fabrication of the cover, whether magnifying or not magnifying, can be by any of several known manufacturing techniques.

A possible disadvantage of the embodiment shown in FIGS. 1 and 4 is that the preferred copper tubing is expensive and somewhat cumbersome to install on the surface of the frustums 11 and 12. FIG. 5 shows an alternative embodiment which does not use separate tubing as conduit means. In the embodiment of FIG. 5, which is in other respects like that of FIG. 4, the fluid conduit means comprise channels 45 molded or otherwise shaped into the surfaces of the inner and outer frustums 41 and 42. To retain the fluid, shown as 46 in FIG. 5, in the channels, a member 47 shaped conformably to the frustums overlies the channels in sealing relationship thereto. Member 47 may comprise either translucent material or opaque material, such as sheet copper, having a light absorbing surface. In either case, the fluid path through the collector of FIG. 5 is substantially equivalent to that through the collector of FIG. 4.

Solar heat collectors according to the invention have a number of advantageous features over collectors of the prior art. First, if the frame is fabricated from polycarbonate or other plastic type materials, colors can be molded into the frame providing a pleasing and unobtrusive finish for the units as installed. Second, the design of the unit provides effectively the same collecting area and/or volume as four to six standard flat panels of the prior art. Third, given the fact that a typical unit for domestic hot water use is approximately two feet high by six to eight feet in diameter, the collector can be placed in a sunny area of a yard or the like with flowers or shrubbery planted around it; thus the unit need not be mounted on a roof as is often the case with flat panel collectors, and accessibility is improved. Fourth, the open area 50 shown in both FIGS. 4 and 5 under the collecting surface, can be filled with insulating material and thereby provide a well insulated and more efficient heat collecting unit with very low losses from the unit itself.

While I have shown and described certain present preferred embodiments of the invention, it is to be distinctly understood that the invention is not limited thereto but may be otherwise variously embodied within the scope of the following claims.

I claim:
1. A solar collector comprising:
a frame defining an opening having a first diameter;
a downwardly converging frusto-conical wall portion of smaller diameter than said first diameter positioned within said frame and attached thereto;
an upwardly converging frusto-conical wall portion of smaller diameter than the minimum diameter of the downwardly converging frusto-conical wall portion positioned within said frame and within the downwardly converging frusto-conical wall portion and attached thereto;

fluid conduit means lying in parallel displacement on the downwardly and upwardly converging wall portions, said fluid conduit means being provided with inlet and outlet means to permit the flow of fluid into and out of said fluid conduit means, said fluid conduit means circulating fluid along a first spiral path disposed on said downwardly converging wall portion and a second spiral path disposed on said upwardly converging wall portion, said fluid conduit means being provided with a light absorbing surface to permit fluid to be heated by sunlight striking said fluid conduit means, said first and second spiral paths being interconnected;

circulating means for circulating fluid along a circulation path through said fluid conduit means, said circulation path including both said first and second spiral paths; and cover means fixed to said frame for covering said fluid conduit means yet permitting the passage of sunlight thereto.

2. The solar collector of claim 1 wherein said circulating means includes a pump in flow communication with said second spiral path by said inlet means to introduce fluid thereto, said first spiral path having said outlet means associated therewith and with the return side of said pump such that fluid is circulated from said pump to said second spiral path via said inlet means, then flows along said first spiral path and is returned to said pump via said outlet means.

3. The solar collector of claim 2 wherein said fluid conduit means includes tubing formed in a spiraled outer coil supported by said downwardly converging wall portion and in a spiraled inner coil supported by said upwardly converging wall portion, said first spiral path being through said outer coil and said second spiral path being through said inner coil.

4. The solar collector of claim 3 wherein said inlet means inputs fluid at the top of said inner coil and said outlet means withdraws heated fluid from the top of said outer coil, said inner and outer coils being interconnected at the bottom of said downwardly and upwardly converging wall portions to permit the passage of fluid from said inner coil to said outer coil.

5. The solar collector of claim 4 wherein the tubing on both said inner and outer coils is wound tightly in generally vertically stacked loops such that the individual loops of tubing within each respective coil contacts each adjacent loop of tubing.

6. The solar collector of claim 5 wherein said frame is generally circular in shape.

7. The solar collector of claim 6 wherein said cover means includes a dome-shaped cover.

8. The solar collector of claim 7 wherein said cover has a central portion and a peripheral edge, said cover being thicker at said central portion than at said peripheral edge.

9. A solar collector comprising:
a frame defining an opening having a first diameter;
a downwardly converging frusto-conical wall portion of smaller diameter than said first diameter positioned within said frame and attached thereto;
an upwardly converging frusto-conical wall portion of smaller diameter than the minimum diameter of the downwardly converging frusto-conical wall portion positioned within said frame and within the downwardly converging frusto-conical wall portion and attached thereto, said upwardly and downwardly converging wall portions having substantially the same heights relative to said frame;

fluid conduit means lying in parallel displacement on the downwardly and upwardly converging wall portions, said fluid conduit means being provided with inlet and outlet means to permit the flow of fluid into and out of said fluid conduit means, circulating fluid along a first spiral path disposed on said downwardly converging wall portion and a second spiral path disposed on said upwardly converging wall portion, said fluid conduit means being provided with a light absorbing surface to permit fluid to be heated by sunlight striking said fluid conduit means, said first and second spiral paths being interconnected;

circulating means for circulating fluid along a circulation path through said fluid conduit means, said circulation path including both said first and second spiral paths; and cover means fixed to said frame for covering said fluid conduit means yet permitting the passage of sunlight thereto.

10. The solar collector of claim 9 wherein said fluid conduit means includes tubing formed in a spiraled outer coil supported by said downwardly converging wall portion and in a spiraled inner coil supported by said upwardly converging wall portion, said first spiral path being through said outer coil and said second spiral path being through said inner coil.

11. The solar collector of claim 10 wherein the tubing on both said inner and outer coils is wound tightly in generally vertically stacked loops such that the individual loops of tubing within each respective coil contacts each adjacent loop of tubing.

12. The solar collector of claim 11 wherein said frame is generally circular in shape.

13. The solar collector of claim 12 wherein said circulating means includes a pump in flow communication with said second spiral path by said inlet means to introduce fluid thereto, said first spiral path having said outlet means associated therewith and with the return side of said pump such that fluid is circulated from said pump to said second spiral path via said inlet means, then flows along said first spiral path and is returned to said pump via said outlet means.

14. The solar collector of claim 13 wherein said inlet means inputs fluid at the top of said inner coil and said outlet means withdraws heated fluid from the top of said outer coil, said inner and outer coils being interconnected at the bottom of said downwardly and upwardly converging wall portions to permit the passage of fluid from said inner coil to said outer coil.

15. The solar collector of claim 14 wherein said cover means includes a dome-shaped cover having a central portion and a peripheral edge, said cover being thicker at said central portion than at said peripheral edge.

16. A solar collector comprising:
a frame defining an opening having a first diameter;
a downwardly converging frusto-conical wall portion of smaller diameter than said first diameter positioned within said frame and attached thereto;
an upwardly converging frusto-conical wall portion of smaller diameter than the minimum diameter of the downwardly converging frusto-conical wall portion positioned within said downwardly converging wall portion and attached thereto, said upwardly and downwardly converging wall portions having substantially the same height relative to said frame;

fluid conduit means having outer and inner coils defining first and second spiral paths, respectively, lying in parallel displacement on the downwardly and upwardly converging wall portions, respectively, said fluid conduit means being provided with an inlet line for the introduction of fluid into said fluid conduit means and an outlet line for the withdrawal of heated fluid from said fluid conduit means, said inner and outer coils being provided with a light absorbing surface to permit fluid to be heated by sunlight striking said fluid conduit means, said inner and outer coils being interconnected to permit the passage of fluid therebetween without exiting said solar collector;

a pump connected to said inlet and outlet lines for circulating fluid along a circulation path including said first and second spiral paths; and a domed cover affixed to said frame for covering said fluid conduit means yet permitting the passage of sunlight thereto.

17. The solar collector of claim 16 wherein said frame is cylindrical and includes a generally vertical exterior wall supporting said downwardly converging wall portion.

18. The solar collector of claim 17 wherein said downwardly and upwardly converging wall portions are interconnected by a generally horizontally disposed lower planar transition member.

19. The solar collector of claim 18 wherein said inlet line inputs fluid at the top of said inner coil and said outlet line withdraws heated fluid from the top of said outer coil, said inner and outer coils being connected along said lower planar transition member.

20. The solar collector of claim 19 wherein said inner and outer coils are formed of tubing wound tightly in generally vertically stacked loops such that the individual loops of tubing within each respective coil contacts each adjacent loop of tubing.

* * * * *